Oct. 24, 1967   A. SCHEIDECKER   3,349,197
PANTOGRAPH-TYPE CURRENT COLLECTOR
Filed Oct. 21, 1964   5 Sheets-Sheet 1

Oct. 24, 1967  A. SCHEIDECKER  3,349,197
PANTOGRAPH-TYPE CURRENT COLLECTOR
Filed Oct. 21, 1964  5 Sheets-Sheet 4

FORCE VOLTAGE TRANSDUCER

SWITCHES

DYNAMO

RELAY

United States Patent Office 3,349,197
Patented Oct. 24, 1967

3,349,197
PANTOGRAPH-TYPE CURRENT COLLECTOR
Abel Scheidecker, Eaubonne, France, assignor to Etablissements L. Faiveley, Saint-Ouen, Seine, France
Filed Oct. 21, 1964, Ser. No. 405,538
Claims priority, application France, Oct. 24, 1963, 951,601
5 Claims. (Cl. 191—67)

The invention relates to a pantograph-type current collector in which the actual collector, a bow or slide contact, is supported by an articulated or hinged arrangement. The weight of the moving parts of the device in its operating position is counterbalanced by springs, and these springs have the additional function to ensure a certain contact pressure between the collector and the catenary.

Although not specifically restricted in this manner, the invention relates particularly to arrangements in which the springs are so arranged and calculated that, when the vehicle carrying the pantograph is stationary, the effort exerted on a given catenary or trolley wire is the same for all heights of the articulated support device from the lowest to the highest position. This force is called the static force of the pantograph on a given catenary.

On the other hand, the level of the contact wire of the catenary is naturally variable, owing to structures, such as bridges, tunnels, underpasses and the like and also in consequence of the bow which lifts the wire between the support points of the catenary on the columns. Owing to these variations in the height, the pantograph moves continuously when the supporting vehicle is in motion.

If the velocity is not too high, the static force of the pantograph on the catenary is sufficient in order to take up the inertia efforts of the articulated system; however, with increasing speed there arrives a moment when this static effort is no longer sufficient. The inertia effects increase with the speed and the force of the pantograph on the catenary also increases.

It is therefore necessary to add to the static effort, which is constant, an additional effort or force.

Up to now, this supplementary effort has been supplied by the aerodynamic effects of the current of air, generated during the motion of the vehicle, on the pantograph; this effect is a direct function of the speed. Apparatus is tested in wind tunnels and the shape is studied in order to produce a function increasing with the effort exerted by the flow of air according to a predetermined law.

This solution has drawbacks, in view of the unpredictable atmospheric conditions and especially of the wind. Since the velocity of the wind and its direction change continuously relative to that of the vehicle, the additional force applied by the pantograph on the catenary differs frequently from the calculated values which must be obtained for a correct power take-off.

The present invention has the object of eliminating these disadvantages.

According to the invention, pantographs are still tested in wind tunnels, but contrary to present-day practice, their shape is tested with a view to obtaining a aerodynamic lift which is zero or increases only very slightly with the speed, so as to suppress the aerodynamic effects of the air current and to eliminate thus also the influence of the wind forces. The additional force to be supplied to the static force is generated by any known means by an auxiliary device, the action of which varies as a function of a parameter, and preferably of the speed of the train itself.

It should here be noted that the correction of the force application to which the present patent relates differs completely from the force correction disclosed in U.S. patent application Ser. No. 63,168, now Patent No. 3,238,-314, included herewith by way of reference. The correction of this latter patent has the object of adjusting continuously the value of the force applied to the catenary in accordance with a reference value, whilst the present invention relates to modifying this mean reference value so that the deviations from this mean value do not exceed a measure permitting the disengagement between the current collector and the catenary.

These two correcting methods are therefore completely different; if required, they can be used concurrently, so that they are either added one to the other or used in combination.

The simplest embodiment of the invention comprises, in the operating compartment of the vehicle, an arrangement for measuring remotely the speed of one part, and a remote control device permitting the operator to apply an additional force to the supporting structure as a function of the measured speed.

According to a more up-to-date embodiment, a servo control will be controlled automatically from the speed measuring device.

According to a further feature of the invention, it is possible to use for controlling the additional force application another parameter than the velocity. In the above mentioned U.S. patent application No. 63,168, now Patent No. 3,238,314, the applicant disclosed different means for measuring remotely the pressure exerted by the current collector on the catenary (or by the catenary on the current collector).

A further embodiment of the present invention consists in measuring, preferably by an integrating measurement, the means deviations relative to the mean pressure caused by the fixed points of the catenary, i.e., by the points of attachment to the supports. This mean deviation denotes the inertia forces in existence and thus of the speed and enables the pressure to be corrected as a function of this parameter.

This invention will be further explained, by way of example, with reference to the accompanying drawings, showing by way of non-limitative illustration two embodiments thereof, and in which.

Figure 1:
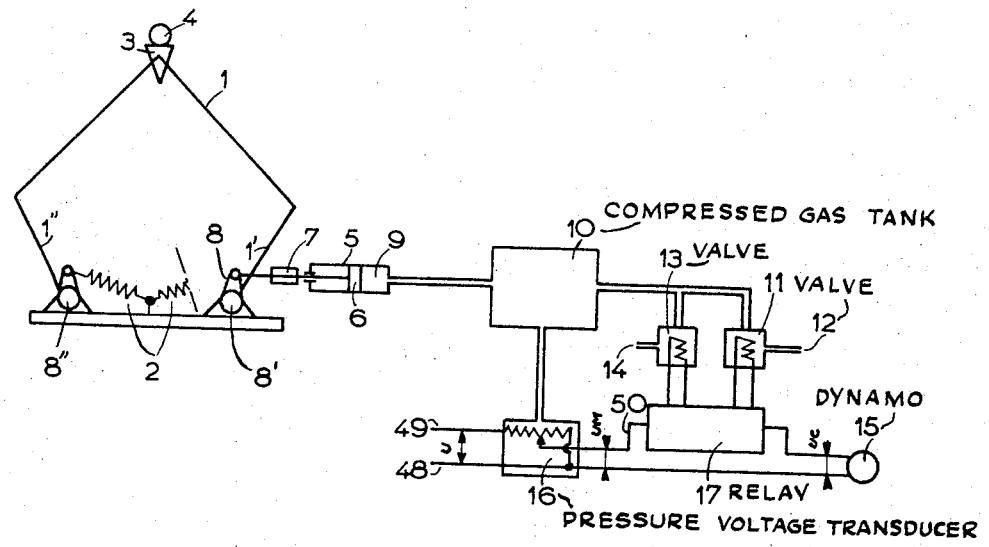
FIG. 1 is a diagrammatic representation of a first embodiment of the invention.

FIG. 1 shows very diagrammatically a pantograph of known construction, comprising an articulated supporting structure of generally pantagonal shape, shown generally at 1, which is affected by springs 2 in the opening direction, and the function of which is to counterbalance the weight of the moving parts of the assembly and to assure a constant static effort of the bow 3 on the catenary 4 without regard to the elevation of the bow. This conventional and known construction is not shown in detail.

A pneumatic jack 5 acts through its piston 6 and an insulator 7 on a connecting rod 8; keyed on to a shaft 8' which controls the rotation of the connecting rod 1', 1" of the articulated system. The normal connecting rod arrangement for transmitting the force to the shaft 8" from the shaft 8' is not shown in the drawing.

The chamber 9 of the jack 5 is supplied with compressed air from a tank 10, the volume of which is so calculated that the displacement of the piston 6 in the cylinder 5, due to collapsing or extending the articulated system, does not affect the pressure substantially. 11 is an electric valve for purging the system with an outlet 12 to the outer air, and 13 is an electric supply valve with an inlet 14. A tachometer dynamo 15, actuated by the wheels of the locomotive, yields across its terminals a voltage UC which forms the reference voltage proportional to the speed. A transducer from pressure to tension 16, supplied with a voltage U, supplies a variable voltage UM which is proportional to the pressure in the accumulator tank 10 and measures, in fact, the pressure therein.

Figure 2:
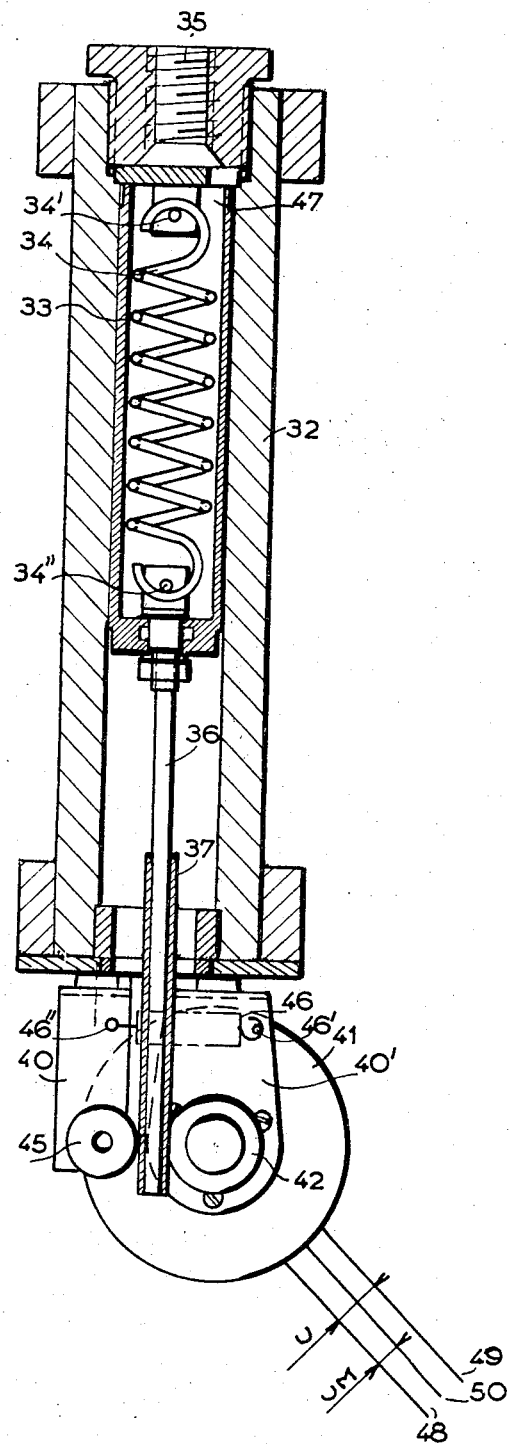
FIG. 2 is a partial cross-section in elevation of a pressure tension converter.
Figure 3:
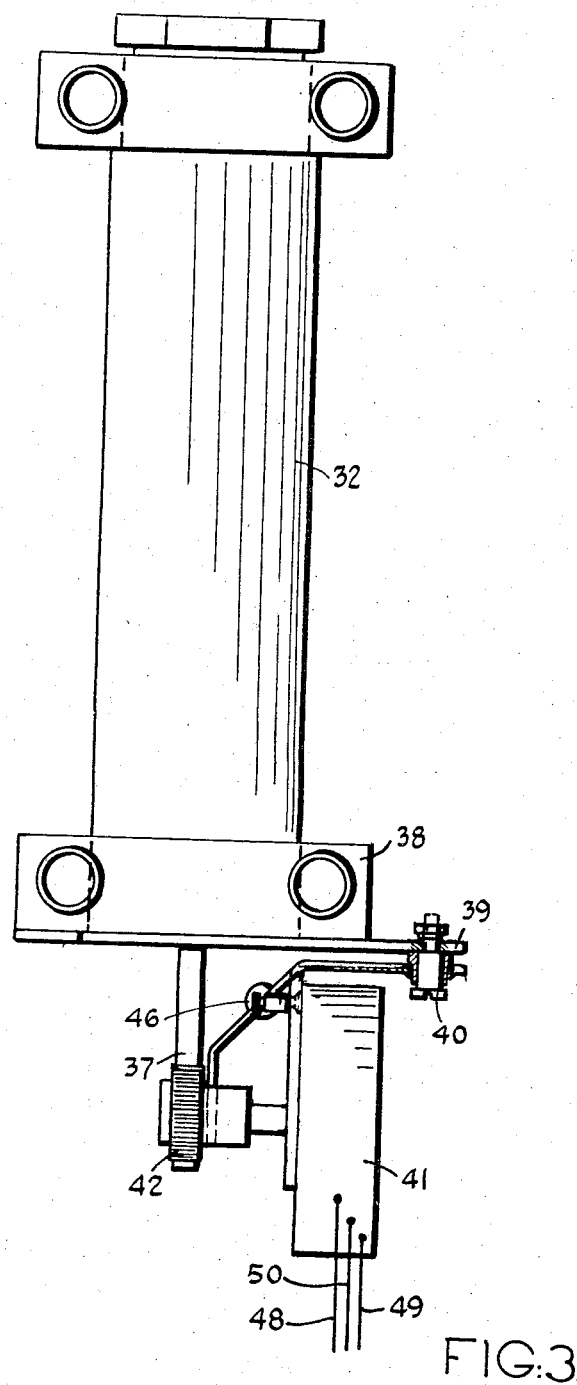
FIG. 3 is a plan view of the converter of FIG. 2.
Figure 4:
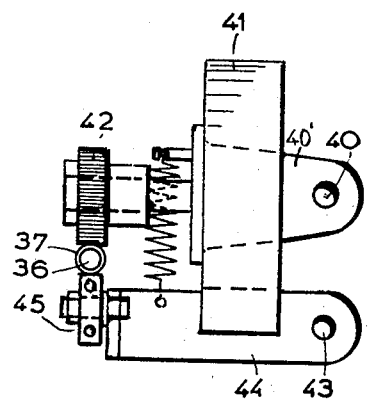
FIG. 4 is a partial end view of this converter from the right side in FIG. 3.

Such a pressure-voltage transducer 16 is shown in FIGS. 2 to 4. It consists of a cylinder 32 in which slides a piston 33 urged into its starting position by a return spring 34, fixed at 34′ to the cylinder 22 and at 34″ to the piston 33. The cylinder communicates with the accumulator 10 through a connection 35. The rod 36 of the piston 33 is located in a rubber tube 37 to improve its adhesion.

A support 38 integral with the cylinder 32 carries a plate 39 on which is mounted a pivot 40 of a member 40′ supporting a rheostat 41 with rotating slide, on the spindle of which is keyed a smooth roller 42.

The plate 39 carries also a pivot 43 of a member 44 supporting a smooth roller 45 formed by a small ball bearing.

The rod 36 of the piston is retained between the two rollers 42 and 45 by means of a spring 46, the ends of which 46′, 46″ are integral, respectively, with the members 40′ and 44, the assembly being such that the rod 36 is not subjected to any flexional force.

When the device is in use, the piston 33 is located in an intermediate position between the two ends of the cylinder 32. Any rise in the pressure in the chamber 47 of the cylinder moves the piston downwards, and any drop in the pressure causes the piston to be moved by the spring 34 upwards. The rectilinear movements of the piston as transmitted through the rod 36 and transformed into rotational movements of the roller 42 and thus of the moving slider of the rheostat 41. The constant input voltage U applied to the conductors 48, 49 is transformed into a variable voltage NM between the conductors 49 and 50, as a function of the air pressure in the chamber 47 and thus also in the tank 10. However, it is also possible to use pressure-voltage transducers of another type to that just described.

Finally, an electronic threshold and hysteresis relay 17 receives these voltages UM and UC and energizes, in accordance with the difference between UM and UC, one or the other of the electric valves, and increases or maintains or decreases the pressure in the tank 10 as required.

Figure 5:
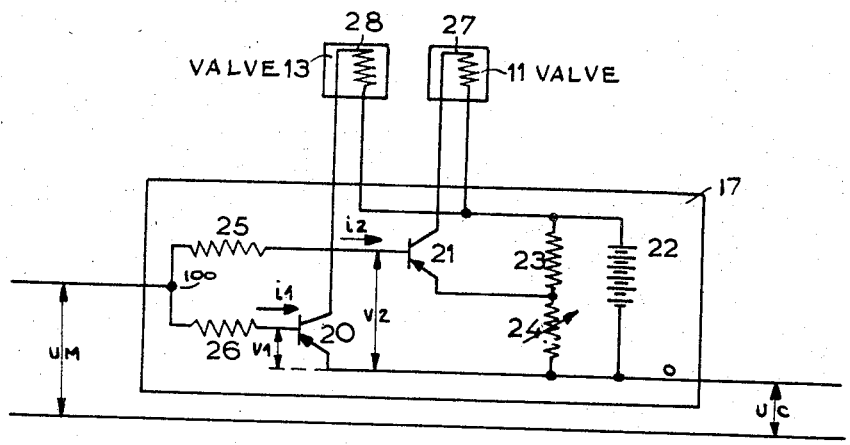
FIG. 5 is a diagram of the electronic relay circuit for varying the compressed air pressure as a function of the speed of the train.

FIG. 5 shows the circuit diagram of this relay. The two voltages UC and UM are supplied by very low-impedance sources. The electronic system comprises two transistors 20 and 21 supplied by a D.C. source 22, two resistors 23, 24 with values R1 and R2 and so charged that the emitter of the transistor 21 has a different potential to that of transistor 20. The resistor 24 may also be controllable so as to vary this potential gap. Each transistor has an input resistor, 25 and 26, respectively, having the value R3. The transistor 21 controls the electric purge valve 11, the resistance of which, having the value $R_P$ is shown at 27, and the transistor 20 controls the electric feed valve 13, the winding resistance $R_a$ of which is shown at 28.

The electric valves are one direct (purge valve 11) and the other inverse (feed valve 13), that is to say, when both are energized, the first allows air to flow whilst the second is closed, and vice versa when they are de-energized.

The operation is as follows:

If we assume as zero the potential of the emitter of transistor 20, the potential of the emitter of transistor 21 is negative relative to that of 20 by a value of $$E \times R2$$
$$\overline{R1 + R2}$$

Figure 6:
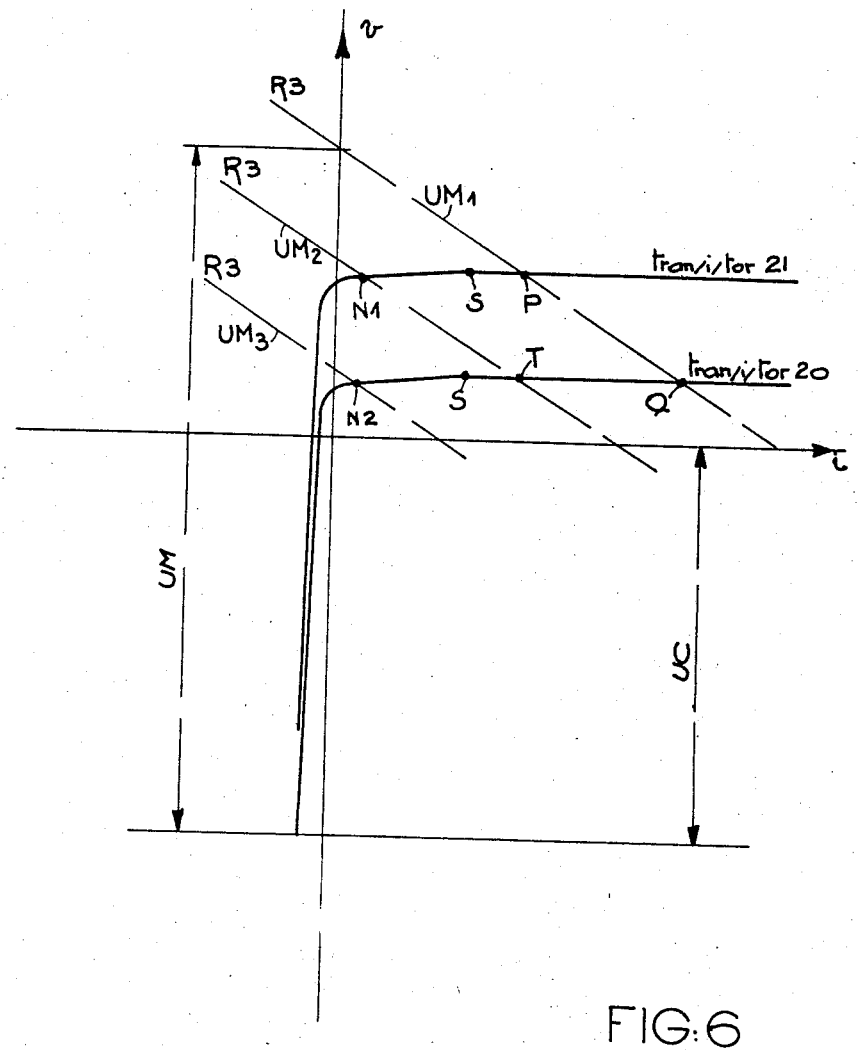
FIG. 6 is a diagram explaining the relay in FIG. 5.

The input characteristics $v1/i1$ and $v2/i2$ of the two transistors 20 and 21 are shown in the curves in FIG. 6, where the intensities are entered along the abscissae and the voltages along the ordinates. Below the points $N_1$, $N_2$ of the curves, the corresponding transistor is blocked and carries no collector current. From the point S of each curve, the transistor is saturated and has a collector current of $E/Ra$ or $E/Rp$, according to whether one considers transistor 20 or 21.

The two curves $v1/i1$ and $v2/i2$ are identical but spaced from one another in voltage by the adjustment of the resistor 24.

If an excessive voltage UM1 is produced, indicating an excessive pressure in the tank 10, the two input curves of the transistors which coincide on the graph, with the slope R3 (the resistance of the converter being negligible compared with the resistances R3) intersect the input curves at the points P and Q in the zones where each transistor is saturated, the electric valves are energized, the tank is purged and the supply is blocked.

If the pressure drops in the tank, the voltage UM, representing this pressure, drops and approaches the points P and Q of the blocking points N1 and N2.

When the voltage reaches a value UM2, the point P has shifted to N1 and the point Q to T. The transistor is blocked, the electro-valve 11 de-energized and blocks the purge, the transistor 20 is still saturated, the electric valve 13 energized and blocks the feed inlet, and the pressure in the tank 10 has the optimum value.

If the pressure in the tank continues to drop for any reason and the voltage UM reaches a value UM3, the transistor 21 remains blocked and the transistor 20 becomes blocked, deenergizing the electric valve 13 which, being of the inverse type, supplies the tank in order to restore the pressure to a suitable value.

The preceding explanations assume that UC is constant and UM variable.

The graph in FIG. 6 shows that the difference $UM-UC$ is only important if these two voltages vary either one or the other or one and the other.

Figure 7:
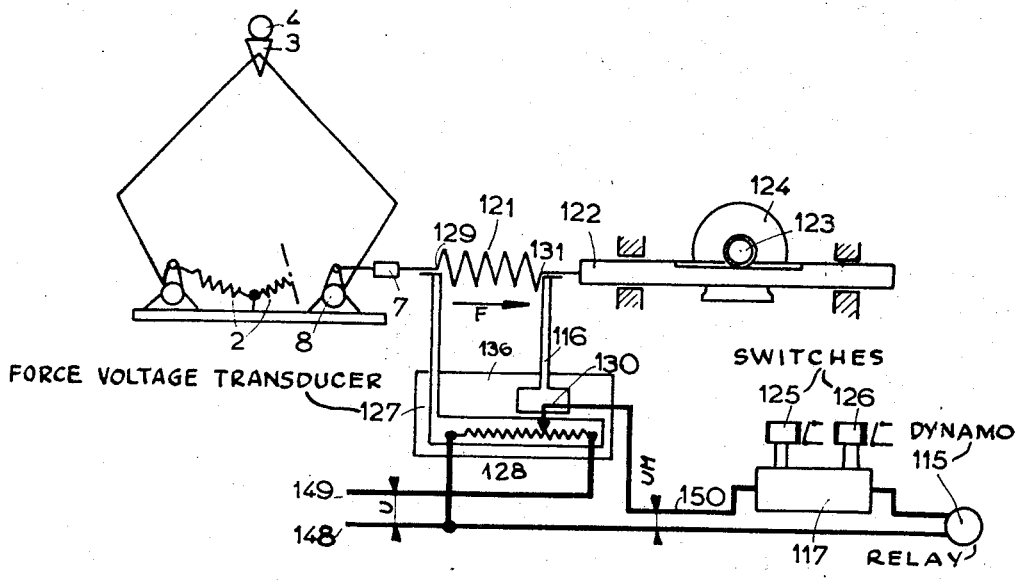
FIG. 7 shows a general layout diagram of a second embodiment of the invention.

In the embodiment of FIG. 7 (in which the part to the left of the insulator 7 is the same as in FIG. 1), the spring 121 has the same function as the tank 10 in FIG. 1. Said spring is located between 129 and 131, i.e., the insulator 7 and the rack 122 which transmits the additional force, and submitted therefore the movements from its first connecting point 129, imposed by the movements of the pantograph 1, and thus of the slider contact 3, without the movements of the point 129 affecting substantially the operation of the rack 122. The rack 122 is controlled by a pinion 123 on the shaft of a motor 124, either directly or through a reducing gear.

A tachometer dynamo 115 has the same object as in the previous embodiment, namely to supply a voltage UC which is proportional to the speed of the vehicle. The force-voltage transducer 127, formed by a rheostat the resistance element 128 of which is supported by a support 136 integral with the translation point 129 and following its movements whilst the slider 130 is connected rigidly at 131 by a mechanical link 116 and follows its movements. This transducer, supplied by a voltage U from the circuit 149 supplies into the circuit 148, 150 a voltage UM which is proportional to the lengthening of the spring 121 and thus to the additional force applied to the slide contact of the pantograph collector.

An electronic threshold and hysteresis relay 117, similar to the relay 17 in the previous embodiment receives on the one hand the tension UM from the converter 127 and on the other hand the tension UC from the dynamo 115.

This relay energizes through the transistors 20 and 21 one or the other of the contactors 125 and 126 which control the supply to the motor 124 in order to increase, maintain or decrease—in accordance with the value $UM-UC$—the lengthening of the spring 121 and consequently its tension, by stopping or actuating in one direction or the other the motor 124. The contactors 125 and 126 fulfill here the role of the electric valves 11 and 13 in the previous embodiment.

The only difference is the following:

In the first example, the relay 17 is such that, the electric valves being one a direct action and the other a reverse action valve, may be energized at a certain moment at the same time. Consequently between the input 100 and the electro-valve 11, an amplification chain with transistors and a flip-flop will be conveniently provided in order to produce the sudden actuation of the valve 11. Between the input 100 and the valve 13 is the same amplification chain with transistors and the same flip-flop so as to produce the same sudden actuation of the valve 13. These two chains and their flip-flops are not shown in FIG. 5 for reasons of clarity, and also because the invention is independent of such means which are conventional in electronic applications.

In the present embodiment of FIG. 7 the relay 117 must be so constructed that the contactors are never energized at the same time. To this end, there is provided, between the input 100 and one switch, an amplification chain with transistors and a flip-flop for producing the sudden engagement of the switch, whilst between the input 100 and the other switch, the amplification chain has $n+1$ transistors so as to produce the reversal in the energization of the other switch, and also here a flip-flop ensures the sudden actuation.

Due to the potentiometers which form part of the pressure voltage transducers 16 or 127 it is possible to operate the correction according to any predetermined speed function. The effects of the inertia, increasing as the square of the speed and the resistances of the potentiometers can be calculated accordingly but it appears that under now prevailing velocity conditions a correction proportional to the velocity may be considered as sufficient.

What I claim is:

1. A current collector from an overhead line for an electrically powered vehicle in which the pressure applied to press the sliding element against the line varies with the speed of the vehicle comprising: an articulated structure supporting said collector, said structure being supported by said vehicle and having a substantially zero aerodynamic lift; means for supplying a varying mechanical pressure to said current collector; means for measuring the speed of the vehicle; means for measuring said pressure; electro-mechanical means for comparing the measurements; and means responsive to said comparison commanding the supply means of said pressure to vary said pressure as a function of the speed of the vehicle.

2. A current collector from an overhead line for an electrically powered vehicle in which the pressure applied to press the sliding element against the line varies with the speed comprising: an articulated structure supporting said collector, said structure being supported by said vehicle and having a substantially zero aerodynamic lift; means integral with said vehicle, for supplying a varying mechanical pressure to said current collector; pressure voltage transducer means for supplying a voltage varying with the mechanical pressure applied to said collector; speed-voltage transducer means for supplying a voltage varying with the speed of the vehicle; means for comparing such voltages commanding the means supplying a varying mechanical pressure and varying said pressure as a function of the speed through said comparison.

3. A current collector according to claim 2 in which said means for supplying a varying mechanical pressure comprises a tank for holding gaseous fluid under pressure; an inlet on said tank for supplying compressed gaseous fluid thereto; an outlet on said tank for discharging gaseous fluid therefrom; a valve in each of said lines, both valves being controlled by the voltage comparison means for adapting the gas pressure in the tank to the speed of the vehicle; said tank being operatively connected to the pressure voltage transducer; a fluid servomotor, the piston of which is linked to the pantograph and transforms the gas pressure into the required pressure on said pantograph.

4. A current collector according to claim 3 in which the ratio between the volume of said tank and said servomotor is such that the pressure in the tank is substantially independent of the position of the piston in said servomotor.

5. A current collector according to claim 2 in which said means for supplying a varying mechanical pressure comprises displaceable rack means; a motor controlling the position of said rack means; resilient connecting means connecting said rack means to said pantograph and providing to the pantograph a lift pressure depending on the relative position of the rack means; switch means mounted in the supply circuit of the motor actuated by the voltage comparison for controlling the forward and backward rotation of the motor and the corresponding position of the rack means.

References Cited

FOREIGN PATENTS 327,604  4/1903  France.
146,626  12/1903  Germany.

ARTHUR L. LA POINT, *Primary Examiner.*

STANLEY T. KRAWCZEWICZ, *Examiner.*